United States Patent Office 3,459,678
Patented Aug. 5, 1969

3,459,678
OLEFIN HYDRATION CATALYST
Hugh J. Hagemeyer, Jr., and Max Statman, Longview, Tex., assignors to Eastman Kodak Company, Rochester, N.Y., a corporation of New Jersey
No Drawing. Filed Jan. 3, 1966, Ser. No. 517,982
Int. Cl. B01j *11/82, 11/58;* C07c *29/08*
U.S. Cl. 252—435                                    6 Claims

ABSTRACT OF THE DISCLOSURE

An improved catalyst for vapor phase hydration of olefin processes is obtained by soaking a calcined siliceous support in phosphoric acid and then heating the acid impregnated support at a temperature in the range of 220–240° C. in the presence of an oxygen-containing gas for a period of 8–30 hours.

---

This invention relates to a catalyst for the hydration of olefins. In a specific aspect this invention relates to a supported phosphoric acid catalyst for the hydration of olefins and to a method for preparing such a catalyst possessing improved activity in the direct vapor phase hydration of olefins to alcohols.

The direct vapor phase hydration of olefins is well known in the art. In this process an olefin and steam are reacted in the presence of a catalyst at temperatures of 250–320° C. and under superatmospheric pressures. The most common catalyst employed is phosphoric acid deposited on a porous support such as diatomaceous earth, kieselguhr, and the like. The selection of catalyst supports is limited by the necessity of it having a large surface area so that maximum contact between the catalyst and olefin can be attained. Generally, a carrier having a surface area of 7–20 square meters per gram is satisfactory. In the preparation of the catalyst, the support selected is impregnated with phosphoric acid and then dried. While the catalysts so prepared have been satisfactory, they suffer from a number of disadvantages. One disadvantage is the migration of the phosphoric acid, which is present as a liquid under reaction conditions, from the support in the direction of the process flow through the reactor. This migration of acid from the catalyst bed is particularly high during the start-up and initial operating periods. The acid migration not only causes rapid inactivation of the catalyst and reduced conversion rates but it also causes corrosion poblems requiring the use of expensive equipment in the reaction apparatus. Another problem encountered with catalysts of this type is the entrainment of fine particles, resulting from the disintegration of the catalyst support, in the reactor effluent. These fine particles, entrained by the migrating liquid acid, can cause fouling and plugging of the reaction system, thereby limiting the duration of reactor operation.

Another disadvantage of the prior art catalysts has been their inadequate mechanical strength. The structural properties of the catalyst support are measured by its resistance to a crushing force in terms of kilograms. The commerically available calcined siliceous carriers suitable for catalysts employed in hydrating olefins exhibit crush strengths of 2 to 3 kilograms of force and under reaction conditions will exhibit shrinkages of up to 18% in volume with 15% being crushed to less than 20 mesh. These properties limit reactor runs and cause plugging. Various treatments of the acid impregnated support have been suggested but none has proved entirely satisfactory.

It is accordingly an object of this invention to provide a catalyst for the direct vapor phase hydration of olefins which is more efficient over prolonged periods of operation. Another object is to provide a catalyst consisting of phosphoric acid adsorbed on a porous support which exhibits improved mechanical strength and acid permanence. Still another object is to provide an improvement in the process of directly hydrating olefins to alcohols. The nature of other objects of this invention will become apparent to those skilled in the art upon reading the description and examples to follow.

We have discovered that through a unique series of steps an olefin hydration catalyst possessing high dimensional stability and resistance to crushing, superior acid permanence and thus improved efficiency can be obtained. These unique preparative steps comprise soaking a calcined siliceous support in phosphoric acid and then heating the acid impregnated support in the presence of an oxygen containing gas.

We have obtained the best results when the catalyst support is a calcined, naturally occurring diatomaceous material of 6–10 mesh particle size. While such a support, when not treated according to our invention, has a crush strength of 2.1 to 2.2 kilograms, the catalyst prepared according to our method exhibits a hardness or crush resistance strength of 4.5 to 6 kilograms. Although heating such a support after it has been impregnated with acid will increase the mechanical strength, it does not impart to the catalyst the mechanical strength and acid permanence displayed by our catalyst. As a result, at the end of comparable tests, a catalyst prepared without heating in the presence of oxygen showed a shrinkage of 18% with 15% being crushed to less than 20 mesh, while our catalyst showed only 1.5% shrinkage and only 2% crushed. The effect resulting from these improved properties is increased catalytic activity and product purity.

Our superior catalyst can be prepared by soaking a support of the type mentioned above in an excess of 60–85% phosphoric acid and, after draining off the excess acid, heating the acid impregnated support at 220–240° C. in the presence of an oxygen containing gas for a period of 8–30 hours. We prefer to treat the support with superheated steam at 200–260° C. and then immerse the support while it is still hot into the acid. This pretreatment produces a greater surface area, better acid penetration and hence, improved catalytic activity. No apparent reaction occurs between the acid and the support and we have not determined the nature of the reaction or transformation which the acid impregnated support undergoes during the heating in the presence of air. However, as will be shown by the examples, some chemical or physical change does occur other than mere drying of the acid. Generally, maximum acid saturation of the catalyst support is attained by soaking the support in a 60–85% solution of phosphoric acid for about an hour. The temperature in the final step is maintained between 220 and 240° C. Temperatures below 220° C. do not effect the desired change in the catalyst, as will be shown in the examples, while temperatures above 240° C. cause the phosphoric acid to convert to pyrophosphoric and polyphoric acids which are not as effective for catalyzing the hydration of olefins as is orthophosphoric acid and therefore should be avoided. The importance of the presence of air or other oxygen-containing gas during the heating of the acid impregnated carrier is shown by the examples, which demonstrate that the absence of oxygen in this step does not provide a catalyst having the improved properties of our catalyst. The period of heating at the temperatures prescribed above must be from 8 to 30 hours.

The permanency of the phosphoric acid in our catalyst permits a ratio of olefin to steam in the reactor feed more favorable for the conversion of the olefin fed to the corresponding alcohol. In the past, the tendency of the phosphoric acid to migrate from the catalyst bed has been curtailed by limiting the amount of water fed as steam to the reactor with the olefin, thus controlling the washing off of the phosphoric acid. As a result of this limitation on the amount of water in the reactor feed, the composition of reactants in the synthesis section has corresponded to low theoretical equilibrium conversion of olefin to alcohol, resulting in lower conversions per pass. A low molar ratio of steam to olefin results in the formation of the corresponding ether and favors the production of polyolefin oil. In order to decrease formation of these by-products, the olefin is normally fed to the reactor with a diluent such as methane in concentrations up to 40%. Although dilution of the olefin reduces by-product formation, it also significantly decreases the conversion of olefin to alcohol and, of course, reduces the overall production rate of the reactor. As is shown in the examples, the migration of phosphoric acid has been practically eliminated from our catalyst, permitting us to omit the diluent from the reactor feed. Other advantages attributable to the permanency of the phosphoric acid or our catalyst are improved product purity, absence of corrosion problems, and prolonged operation without the addition of phosphoric acid containing materials to the catalyst bed.

Our catalyst is adaptable to the direct olefin hydration system illustrated and described in U.S. Patent 2,773,910, although certain parts of that system may be replaced with less expensive materials or even eliminated because of the absence of corrosion problems experienced in the use of our catalyst. Our catalyst can be used in such a system for the direct conversion of olefins having 2 to about 4 carbon atoms. For example, ethylene can be converted to ethanol, propylene to isopropanol, butene-1 or butene-2 to secondary butanol, and isobutylene can be converted to tertiary butanol.

The following examples will serve to illustrate the preparation and application of our novel catalyst and its comparison to catalysts prepared by known methods.

EXAMPLE 1

This example demonstrates the unique steps by which our novel catalyst can be prepared. A sample of calcined diatomaceous earth with the following properties:

| | |
|---|---|
| Size _____mesh__ | 6–10 |
| Surface area _____square meters/gram__ | 12 |
| Crush strength _____kilograms of force__ | 2.2 |
| $R_2O_3$ content _____percent__ | 5 |
| $Fe_2O_3$ content _____do____ | 1.4 | was immersed without previous treatment into an excess of 75% phosphoric acid. This mixture was allowed to stand for one hour and then the excess acid was drained for 30 minutes. The impregnated support was then placed in a tube and air pased over the support. The tube and the air were heated to 230° C. for 18 hours. Upon cooling, the catalyst was ready for use. The crush strength measured on the treated catalyst was 4.7 kilograms.

EXAMPLE 2

To show the importance of the temperature range of 220–240° C., a catalyst was prepared in the manner described in Example 1 except a temperature of 215° C. was used instead of 230° C. The crush strength of this catalyst was 2.3 kilograms.

EXAMPLE 3

A catalyst was prepared in the manner described in Example 1 except a temperature of 225° C. was used instead of 230° C. The crush strength of the resulting catalyst was 4.6 kilograms.

EXAMPLE 4

A catalyst is prepared by impregnating a support such as described in Example 1 with 75% phosphoric acid. Upon draining the excess acid the impregnated support was ready for use. The crush strength of this catalyst was 2.1 kilograms, indicating the necessity for heating the impregnated catalyst in the presence of air.

EXAMPLE 5

A catalyst was prepared in the manner described in Example 1 except steam, containing 27 percent free oxygen, was used as the oxygen-containing conditioning gas while the acid impregnated support was heated at 230° C. for 18 hours.

EXAMPLE 6

A catalyst was prepared in the manner described in Example 1 except the conditioning gas was a mixture of 75% carbon dioxide and 25% oxygen. The crush strength of this catalyst was 4.6 kilograms.

EXAMPLE 7

Using a catalyst support such as described in Example 1 a catalyst was prepared by impregnation with 75% phosphoric acid. After the excess acid was removed, the treated support was placed in a furnace tube such as described in Example 1. The catalyst was exposed to methane instead of air for 18 hours at 230° C. The crush strength of this catalyst was 3.2 kilograms. This example shows that the presence of air markedly increases the mechanical strength of the catalyst.

EXAMPLE 8

Into a suitable reaction vessel containing 500 ml. of catalyst prepared in Example 1 was passed a mixture of 3 parts ethylene, 2 parts methane and 1 part water at 270° C., 1200 p.s.i.g. at a contact time of 33 seconds. Table 1 give the detailed results of this run. As noted from this table, the conversion of ethylene to ethyl alcohol at the end of the first day was 4.3% and at the end of the fifth day was 4.2%. The total shrinkage was 1.5% and the amount of catalyst which would pass a 20-mesh sieve was 2%. The production rates for this run were 8.2 pounds of ethanol per hour per cubic foot of catalyst. Note the low acid migration as indicated by the phosphate in the crude product.

EXAMPLE 9

A catalyst described in Example 4 was tested in a manner described in Example 8. From Table 1 it can be seen that the catalyst of our invention is superior to this catalyst in every way.

EXAMPLE 10

A catalyst described in Example 7 was tested in a manner described in Example 8. This example demonstrates, as indicated in Table 1, that the effectiveness of our catalyst is not merely the result of a heating operation.

TABLE 1

| Example | 8 | 9 | 10 |
|---|---|---|---|
| Catalyst | Ex. 1 | Ex. 4 | Ex. 7 |
| Temperature (° C.) | 270 | 270 | 270 |
| Pressure (p.s.i.g.) | 1,200 | 1,200 | 1,200 |
| Percent ethylene in feed gas | 60 | 60 | 60 |
| Mole ratio ethylene:water | 3:1 | 3:1 | 3:1 |
| Contact time (seconds) | 33 | 34 | 33 |
| Catalyst volume (ml) | 500 | 500 | 500 |
| Percent conversions: | | | |
| 1st day | 4.3 | 4.14 | 4.2 |
| 2nd day | 4.13 | 3.33 | 4.0 |
| 3rd day | 4.2 | 3.16 | 3.5 |
| 4th day | 4.24 | 2.53 | 3.1 |
| 5th day | 4.2 | 0.5 | 2.5 |
| Crude: | | | |
| Oil, p.p.m. | <0.1 | 0.5 | 0.2 |
| Ether, percent | 0.05 | 0.16 | 0.10 |
| Phosphate, p.p.m. | 20 | 1200 | 150 |
| Crush strength (kg.) | 4.7 | 2.1 | 2.6 |
| Percent less than 20 mesh | 2 | 15 | 10 |
| Percent shrinkage | 1.5 | 18 | 6 |

The catalyst prepared in the manner described in Example 6 gave conversions of 4.1 to 4.25 percent through a six day run when tested as described in Example 8. The catalyst prepared according to Example 5 gave a conversion 4.1 to 4.3 percent.

EXAMPLE 11

Each of the catalysts prepared according to Examples 1–4 was tested at conditions which would result in greater alcohol production, as shown in Table II. However, in these runs, ethylene without diluent was used. The catalyst prepared according to Example 1 gave a production rate of 18 pounds of ethyl alcohol per hour per cubic foot of catalyst. The rate of acid migration encountered in the use of the catalysts of Examples 2 and 4 was so severe that each of these runs was shut off at the end of 16 hours of operation. Table II shows the advantages of our catalysts.

TABLE II

| Catalyst | Ex. 1 | Ex. 2 | Ex. 3 | Ex. |
|---|---|---|---|---|
| Temperature (° C.) | 300 | 300 | 300 | 300 |
| Pressure (p.s.i.g.) | 1,200 | 1,200 | 1,200 | 1,200 |
| Percent ethylene used | 100 | 100 | 100 | 100 |
| Mole ratio ethylene:water | 1.4:1 | 1.4:1 | 1.14:1 | 1.4:1 |
| Contact time (seconds) | 34 | 33 | 34 | 34 |
| Catalyst volume (ml.) | 500 | 500 | 500 | 500 |
| Percent conversions: | | | | |
| 1st day | 4.9 | 1.5 | 4.9 | 1.2 |
| 10th day | 5.0 | | 5.0 | |
| 20th day | 4.9 | | 4.9 | |
| 30th day | 4.9 | | 4.9 | |
| Crude: | | | | |
| Percent ether | 0.09 | 0.14 | 0.08 | 0.15 |
| Percent acetaldehyde | 0.02 | 0.04 | 0.03 | 0.03 |
| Oil, p.p.m | <0.1 | 0.4 | <0.1 | 0.3 |
| Phosphate, p.p.m | 20 | 6,500 | 20 | 7,000 |

EXAMPLE 12

This example illustrates the treatment of the catalyst support with superheated steam prior to impregnating in with acid. A catalyst support such as described in Example 1 was treated with superheated steam at 240° C. for one hour and impregnated with 75% phosphoric acid while hot. After cooling, the excess acid was drained away and the impregnated support was treated with air as 230° C. for 18 hours. This catalyst was tested in a manner similar to Example 8. The conversion of ethylene to ethyl alcohol was 4.32% on the first day.

EXAMPLE 13

Using a catalyst described in Example 1, a test was made under the following condition. Ethylene, one part, and water, one part, were passed over this catalyst at 1200 p.s.i.g., 300° C. and a contact time of 45 seconds. The conversion per pass of ethylene to ethyl alcohol was 6.4%. The crude product contained less than 0.1 p.p.m. oil and less than 0.1% diethyl ether.

EXAMPLE 14

A reaction system as described in U.S. Patent 2,773,910 was operated in the following manner. Catalyst, 500 cubic feet, prepared in a manner described in Example 1 was placed in the reactor. A gas stream amounting to 1,610,000 pounds per day of methane and 4,230,000 pounds per day of ethylene was heated in the olefin preheater section and then mixed with steam. This steam amounting to 906,000 pounds per day entered as water and was pumped through a boiler section to the mixing point. The gas-steam mixture then went to the reactor. In the reactor, conditions were maintained at 1200 p.s.i.g. pressure and 270° C. Leaving the reactor, the gases were cooler and entered a product separator. The unreacted gases are returned to the reaction via the recycle compressor, and the alcohol-water mixture goes to crude alcohol storage. No more than half a pint a day of oil was ever recovered in the oil storage tank. Due to the superior acid permanence exhibited by our catalyst, the addition of caustic to the crude product was not required. During the first day 285,000 pounds of ethyl alcohol was produced. The second day's production was 274,000 pounds, and on the fourth day the production rate was still 283,000 pounds. Production continued at near this same rate for 65 days. Make-up ethylene was added to the system via a primary compressor to maintain 60 percent ethylene in the gas.

EXAMPLE 15

Using the catalyst described in Example 4, the system was operated in the manner described in Example 14. The first day's alcohol production was 275,000 pounds. By the third day production was down to 210,000 pounds and only 110,000 pounds on the fifth day. In this example it was necessary to add caustic to neutralize the acid being washed away from the catalyst.

EXAMPLE 16

Using the same system described above, 500 cubic feet of catalyst prepared in the manner described in Example 1 was placed in the reactor. Water was fed into the system at a rate of 1,164,000 pounds per day. The gas stream was 100 percent ethylene and contained no methane. This stream was fed to the reactor at a rate of 2,530,000 pounds per day. The reactor was operated at 300° C. and 1200 p.s.i.g. pressure. Ethyl alcohol 195,000 pounds per day was recovered. Essentially no oil was produced and no caustic was used. The run lasted 32 days.

EXAMPLE 17

Using catalyst prepared as described in Example 4, the system was run as described in Example 16. The unit ran for only 16 hours before completely losing all activity.

The invention has been described in considerable detail with particular reference to preferred embodiments thereof, but it will be understood that variations and modifications can be effected within the spirit and scope of the invention described hereinabove and as defined in the appended claims.

We claim:

1. A method of preparing a catalyst for the hydration of olefins which comprises the steps of impregnating a calcined siliceous support with 60 to 85% orthophosphoric acid and heating the acid impregnated catalyst in the presence of an oxygen containing gas at a temperature of 220 to 240° C. for 8–30 hours.

2. The catalyst prepared according to claim 1.

3. A method of preparing a catalyst according to claim 1 in which said support is impregnated with acid by soaking said support in an excess of 60 to 85% phosphoric acid.

4. A method of preparing a catalyst according to claim 3 in which the support is treated with super heated steam at a temperature of 200–260° C. prior to its immersion in said acid.

5. A method of preparing a catalyst according to claim 3 in which the support is of 6 to 10 mesh particle size and has a surface area of 7 to 10 square meters per gram.

6. A method of making a catalyst according to claim 5 in which the support is a calcined diatomaceous earth.

References Cited

UNITED STATES PATENTS

| 2,120,702 | 6/1938 | Ipatieff | 23—233 |
| 1,851,627 | 3/1932 | Hartley | 252—416 |
| 2,843,640 | 7/1958 | Langlois | 260—683.15 |

PATRICK P. GARVIN, Primary Examiner

U.S. Cl. X.R.

260—641